United States Patent
Wu et al.

(10) Patent No.: US 7,689,412 B2
(45) Date of Patent: Mar. 30, 2010

(54) SYNONYMOUS COLLOCATION EXTRACTION USING TRANSLATION INFORMATION

(75) Inventors: Hua Wu, Beijing (CN); Ming Zhou, Beijing (CN)

(73) Assignee: Microsoft Corporation, Redmond, WA (US)

( * ) Notice: Subject to any disclaimer, the term of this patent is extended or adjusted under 35 U.S.C. 154(b) by 1119 days.

(21) Appl. No.: 10/729,126

(22) Filed: Dec. 5, 2003

(65) Prior Publication Data

US 2005/0125215 A1    Jun. 9, 2005

(51) Int. Cl.
    *G06F 17/21* (2006.01)
(52) U.S. Cl. ............... 704/10; 704/2; 704/5; 704/277
(58) Field of Classification Search .......... 704/1–10, 704/251, 255, 257, 277; 707/3–5, 10, 102
    See application file for complete search history.

(56) References Cited

U.S. PATENT DOCUMENTS

| | | | |
|---|---|---|---|
| 4,868,750 A | 9/1989 | Kucera et al. | 364/419 |
| 5,850,561 A | 12/1998 | Church et al. | 395/794 |
| 6,006,221 A | 12/1999 | Liddy et al. | |
| 6,064,951 A | 5/2000 | Park et al. | |
| 6,092,034 A | 7/2000 | McCarley et al. | 704/2 |
| 6,397,174 B1 | 5/2002 | Poznanski et al. | 704/9 |
| 6,847,972 B1 | 1/2005 | Vernau et al. | 707/101 |
| 7,340,388 B2 | 3/2008 | Soricut et al. | |
| 2002/0111789 A1 | 8/2002 | Hull | 704/4 |
| 2003/0061023 A1 | 3/2003 | Menezes et al. | 704/4 |
| 2003/0154071 A1 | 8/2003 | Shreve | 704/9 |
| 2003/0233226 A1 | 12/2003 | Kim et al. | 704/4 |
| 2004/0006466 A1 | 1/2004 | Zhou et al. | 704/251 |
| 2004/0044530 A1 | 3/2004 | Moore | 704/254 |
| 2004/0254783 A1 | 12/2004 | Isahara | 704/9 |
| 2005/0021323 A1 | 1/2005 | Li | |
| 2005/0033711 A1 | 2/2005 | Horvitz et al. | 706/50 |
| 2005/0071150 A1 | 3/2005 | Nasypny | 704/9 |
| 2005/0125215 A1 | 6/2005 | Wu et al. | 704/1 |

FOREIGN PATENT DOCUMENTS

| | | |
|---|---|---|
| WO | WO 03/060766 A1 | 7/2003 |
| WO | WO 2004/001623 | 12/2003 |

OTHER PUBLICATIONS

F. Smadja; K. R. McKeown; V. Hatzivassiloglou, "Translating Collocations for Bilingual Lexicons: A Statistical Approach", Computational Linguistics, vol. 22, Issuse 1, pp. 1-38, 1996.*

(Continued)

*Primary Examiner*—Huyen X. Vo
(74) *Attorney, Agent, or Firm*—Steven M. Koehler; Westman, Champlin & Kelly, P.A.

(57) ABSTRACT

A method of automatically extracting synonymous collocations from monolingual corpora and a small bilingual corpus is proposed. The methodology includes generating candidate synonymous collocations and selecting synonymous collocations as a function of translation information, including collocation translations and probabilities. Candidate synonymous collocations with similarity scores that exceed a threshold are extracted as synonymous collocations. The extracted collocations can be used later in language generation by substituting synonymous collocations for applications such as writing assistance programs.

34 Claims, 7 Drawing Sheets

OTHER PUBLICATIONS

Barzilay Regina, Kathleen McKeown (2001) . *Extracting Paraphrases from a Parallel Corpus in Proceedings of ACL/EACL, Toulouse.*

Brown P. F., S.A. Del Pietra, V.J. Della Pietra, and R.L. Mercer (1993) . *The mathematics of statistical machine translation: Parameter estimation.* Computational Linguistics, 19(2) : 263-311.

Gasperin C. et al (2001) . *Using Syntactic Contexts for Measuring Word Similarity.* Workshop on Knowledge Acquisition & Categorization, ESSLLI.

Lapata Maria, Scott McDonald and Frank Keller (1999) , *Determinants of Adjective-Noun Plausibility.* In Proceedings of the[9] Conference of the European Chapter of the Association for Computational Linguistics, 30-36. Bergin.

Lin D.K. (1998) . *Automatic Retrieval and Clustering of Similar Words.* In the Proceedings of the 36th Annual Meeting of the Association for Computational Linguistics, Montreal, Canda, pp. 768-774.

Lin D.K. and Patrick Pantel (2001) . *Discovery of Inference Rules for Question Answering.* Natural Language Engineering 7 (4) : 343-360.

Mandala R., T. Tokunaga and H. Tanaka (1999) . *Combining Multiple Evidence from Different Types of Thesaurus for Query Expansion.* In Proceedings of the 22[22] Annual International ACM SIGIR Conference on Research and Development in Information Retrieval. pp. 191-197.

Shinyama Y., S. Sekine, K. Sudo and R. Grishman (2002) . *Automatic Paraphrase Acquisition from News Articles.* Published in the Proceedings of Human Language Technology Conference (HLT 2002); San Diego, USA.

Smadja Frank (1991) . *Macrocoding the lexicon with co-occurrence knowledge.* In Uri Zernik, editor, Lexical Acquisition: Using Online Resources to Build a Lexicon. pp. 165-189. Erlbaum, Hillsdale, NJ.

Smadja Frank (1993) . *Retrieving Collocations from Text:Xtract.* Computational Linguistics 19 (1) : 143-177.

Y. Lü and M. Zhou. 2004. Collocation Translation Acquisition Using Monolingual Corpora, 42nd Annual Meeting of the Association for Computational Linguistics: 167-174.

Ming Zhou, Y. Ding, C. Huang. 2001. Improving Translation Selection with a New Translation Model Trained by Independent Monolingual Corpora, *Computational Linguistics and Chinese Language Processing*, (6)1:1-26.

Chien-Cheng Wu and J.S. Chang. 2004. Bilingual Collocation Extraction Based on Syntactic and Statistical Analyses, *Computational Linguistics and Chinese Language Processing*, (9)1:1-20.

Chun-Chin Chang. Word Translation Disambiguation Using Two Monolingual Corpora. http://nlplab.cs.nthu.edu.tw/roclingstudent/papers/Word%20Translation%20Disambigu ation%20Using%20Two%20Monolingual%20Corpora.pdf at least by 2004.

Maria-Violeta Seretan. 2003. Syntactic and Semantic Oriented Corpus Investigation for Collocation Extraction, Translation and Generation. Ph.D. Proposal, Language Technology Laboratory, Department of Linguistics, Faculty of Arts, University of Geneva.

J.Y. Jian; Chang, Y.C.; Chang, J.S. Collocational Translation Memory Extraction Based on Statistical and Linguistic Information. http://www.iis.sinica.edu.tw/Conference/ROCLING04/camera-ready/P22253.63636027.pdf at least by 2004.

Multilingual Information Access and Management International Research Cooperation. XMELLT Cross-Lingual Multi-Word Expression Lexicons for Language Technology. Dept. of Computer Science, Vassar College; International Computer Science Institute; Univ. of California, Berkeley; Dept. of Computer Science, New York Univ.; Computing Research Laboratory, New Mexico State Univ. http://www.cs.vassar.edu/~ide/XMELLT.html at least by 2004.

T. Dunning. 1993. Accurate Methods for the Statistics of Surprise and Coincidence. *Computational Linguistics*, (19)1:61-74.

A.L. Berger; Della Pietra, S.A.; Della Pietra, V. 1996. A Maximum Entropy Approach to Natural Language Processing. *Computational Linguistics*, (22)1:39-72.

H. Nakagawa. 2001. Disambiguation of Single Noun Translations Extracted from Bilingual Comparable Corpora. *Terminology*, (7)1:63-83.

Smadja, Retrieving Collocations from Text:Xtract,1993,Association for computer Linguistics,vol. 19,No. 1.

Wu et al, "Synonymous Collocation Extraction Using Translation Information", Jul. 2003, ACM, Proceedings of the 41st Meeting on Association for Computational Linguistics vol. 1.

Breidt, Extraction of V-N- Collocations from Text Corpora: A feasibility Study for German, Jun. 1993,Proceedings of the Workshop on Very Large Corpora: Academic and Industrial Perspectives, p. 74-83.

Corpus-based & Statistics-oriented Natural Language Processing Techniques, Qiang Zhou, Computer Science, vol. 22, Issue 4th, pp. 36-40, Dec. 31,1995.

Statistical Phrase-Based Translation, Philipp Koehn et al., Presentations at DARPA IAO Machine Translation Workshop, Text Section 4th, 5th Paragraph 2nd, Jul. 23, 2002.

Estimating Word Translation Probabilities from Unrelated Monolingual Corpora Using the EM Algorithm Source Proceedings of the Seventeenth National Conference on Artificial Intelligence and Twelfth Conference on Innovation Applications of Artificial Intelligence, pp. 711-715, Year of Publication: 2000.

Gao et al., "Resolving Query Translation Ambiguity Using a Decaying Co-Occurrence Model and Syntactic Dependence Relations", Aug. 2002, proc. of the 25th annual international ACM SIGIR conf., pp. 1-8.

Och et al., "Discriminative Training and Maximum Entropy Models For Dtatistical Machine Translation" Jul. 2002, Proc. of 40th meeting of ACL, pp. 1-8.

\* cited by examiner

SYNONYMOUS COLLOCATION EXTRACTION USING TRANSLATION INFORMATION

BACKGROUND OF THE INVENTION

The present invention generally relates to natural language processing. More particularly, the present invention relates to natural language processing including synonymous collocations. A collocation refers to a lexically restricted word pair with a certain syntactic relation that can take the form: <head, relation-type, modifier>. For instance, a collocation such as <turn on, OBJ, light> is a collocation with a verb-object syntactic relation. Collocations are useful in helping to capture the meaning of a sentence or text, which can include providing alternative expressions for similar ideas or thoughts.

A synonymous collocation pair refers to a pair of collocations that are similar in meaning, but not identical in wording. For example, <turn on, OBJ, light> and <switch on, OBJ, light> are considered synonymous collocation pairs due to their similar meanings. Generally, synonymous collocations are an extension of synonymous expressions, which include synonymous words, phrases and sentence patterns.

In natural language processing, synonymous collocations are useful in applications such as information retrieval, language generation such as in computer-assisted authoring or writing assistance, and machine translation, to name just a few. For example, the phrase "buy book" extracted from user's query should also match "order book" indexed in the documents. In language generation, synonymous collocations are useful in providing alternate expressions with similar meanings. In the bilingual context, synonymous collocations can be useful in machine translation or machine-assisted translation by translating a collocation in one language to a synonymous collocation pair in a second language.

Therefore, information relating to synonymous expressions and collocations is considered important in the context of natural language processing. Attempts have been made to extract synonymous words from monolingual corpora that have relied on context words to develop synonyms of a particular word. However, these methods have produced errors because many word pairs are generated that are similar but not synonymous. For example, such methods have generated word pairs such as "cat" and "dog" which are similar but not synonymous.

Other work has addressed extraction of synonymous words and/or patterns from bilingual corpora. However, these methods are limited to extracting synonymous expressions actually found in bilingual corpora. Although these methods are relatively accurate, the coverage of the extracted expressions has been quite low due to the relative unavailability of bilingual corpora.

Accordingly, there is a need for improving techniques of extracting synonymous collocations particularly with respect to improving coverage without sacrificing accuracy.

SUMMARY OF THE INVENTION

A method of generating synonymous collocations that uses monolingual corpora of two languages and a relatively small bilingual corpus. The methodology includes generating candidate synonymous collocations and selecting synonymous collocations as a function of translation information, including collocation translations and probabilities. In some embodiments, the similarity of two collocations is estimated by computing the similarity of their feature vectors using the cosine method. Candidate synonymous collocations with similarity scores that exceed a threshold are extracted as synonymous collocations.

The generated collocations can be used later in language generation. In some embodiments, language generation includes parsing an input sentence into collocations, obtaining stored synonymous collocations, and substituting synonymous collocations into the input sentence to generate another sentence. In other embodiments, an input sentence in a source language can be translated by substituting synonymous collocations in a target language to generate a target language sentence.

DETAILED DESCRIPTION OF ILLUSTRATIVE EMBODIMENTS

Automatic extraction of synonymous collocations is an important technique for natural language processing including information retrieval, writing assistance, machine translation, question/answering, site search, and the like. Collocations are critical because they catch the meaning of a sentence, which is important for text understanding and knowledge inference. Further, synonymous collocations can be difficult for non-English speakers to master. Aspects of the present invention can help users use appropriate alternative or different expressions to express similar ideas and to avoid repetition. Also, users can often ask the same question with different phrases or collocations (e.g. paraphrases) in question/answering systems or query systems used for instance in obtaining information such as a site search used in a wide or local area network.

One aspect of the present invention provides for a method of obtaining synonymous collocation information of a source language such as English by using translation information from a target language such as Chinese. Another aspect of the present invention provides a method for processing an input sentence or text to generate another sentence or text in the same language using synonymous collocations. In still another aspect, the present invention provides a method of translating a source language sentence or text by selecting from target language synonymous collocations to generate a target language sentence or text.

In one view, aspects of the present invention are based on the assumption that two collocations are correlated if their translations are similar. Dependency triples or collocations are used to identify alternative expressions, which allow longer phrases to be captured that might be effective synonymous expressions for a shorter inputted phrase. Large monolingual corpora of different languages are used because they are relatively economical and easily obtained. A relatively small bilingual corpus is also used, especially for training purposes. Since the present invention primarily utilizes unsupervised training, human resources needed to develop manually labeled training data are minimized.

Figure 1:
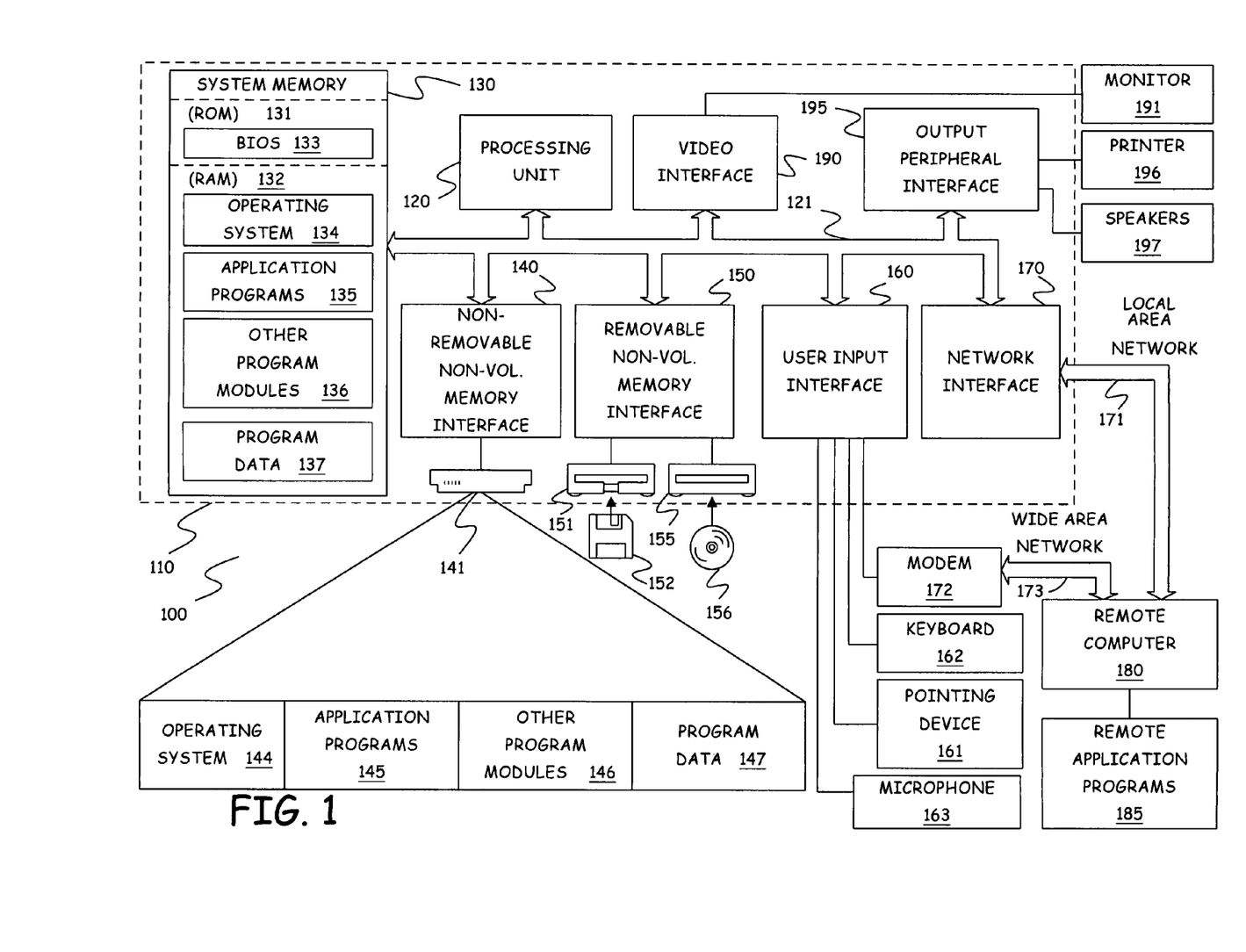
FIG. 1 is a block diagram of one computing environment in which the present invention can be practiced.

Before addressing further aspects of the present invention, it may be helpful to describe generally computing devices that can be used for practicing the invention. FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well-known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCS, minicomputers, mainframe computers, telephone systems, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. Tasks performed by the programs and modules are described below and with the aid of figures. Those skilled in the art can implement the description and/or figures herein as computer-executable instructions, which can be embodied on any form of computer readable media discussed below.

The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general-purpose computing device in the form of computer 110. Components of computer 110 may include, but are not limited to, processing unit 120, system memory 130, and system bus 121 that couples various system components including the system memory to processing unit 120. System bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standard Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and non-volatile media, removable and non-removable media. By way of example, and not limitation, computer readable media may comprise computer storage media and communication media. Computer storage media includes both volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RE, infrared and other wireless media. Combinations of any of the above should also be included within the scope of computer readable media.

System memory 130 includes computer storage media in the form of volatile and/or non-volatile memory such as read only memory (ROM) 131 and random access memory (RAM) 132. Basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, and volatile/non-volatile computer storage media. By way of example only, FIG. 1 illustrates hard disk drive 141 that reads from or writes to non-removable, non-volatile magnetic media, magnetic disk drive 151 that reads from or writes to removable, non-volatile magnetic disk 152, and optical disk drive 155 that reads from or writes to removable, non-volatile optical disk 156 such as a CD ROM or other optical media. Other removable/non-removable, volatile/non-volatile computer storage media that can be used in the exemplary operating environment include, but are not limited to, magnetic tape cassettes, flash memory cards, digital versatile disks, digital video tape, solid state RAM, solid state ROM, and the like. Hard disk drive 141 is typically connected to system bus 121 through a non-removable memory interface such as interface 140, and magnetic disk drive 151 and optical disk drive 155 are typically connected to system bus 121 by a removable memory interface, such as interface 150.

The drives and their associated computer storage media discussed above and illustrated in FIG. 1, provide storage of computer readable instructions, data structures, program modules and other data for computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into computer 110 through input devices such as keyboard 162, microphone 163, and/or pointing device 161, such as a mouse, trackball or touch pad. Other input devices (not shown) may include a joystick, game pad, satellite dish, scanner, or the like. These and other input devices are often connected to processing unit 120 through user input interface 160 that is coupled to the system bus, but may be connected by other interface and bus structure, such as a parallel port, game port or a universal serial bus (USB). Monitor 191 or other type of display device is also connected to system bus 121 via an interface, such as a video interface 190. In addition to the monitor, computers may also include other peripheral output devices such as speakers 197 and printer 196, which may be connected through output peripheral interface 190.

Computer 110 may operate in a networked environment using logical connections to one or more remote computers, such as remote computer 180. Remote computer 180 may be a personal computer, a hand-held device, a server, a router, a network PC, a peer device or other common network node, and typically includes many or all of the elements described above relative to computer 110. The logical connections depicted in FIG. 1 include local area network (LAN) 171 and wide area network (WAN) 173, but may also include other networks. Such networking environments are commonplace in offices, enterprise-wide computer networks, intranets and the Internet.

When used in a LAN networking environment, computer 110 is connected to LAN 171 through a network interface or adapter 170. When used in a WAN networking environment, computer 110 typically includes modem 172 or other means for establishing communications over WAN 173, such as the Internet. Modem 172, which may be internal or external, may be connected to system bus 121 via the user input interface 160, or other appropriate mechanism. In a networked environment, program modules depicted relative to computer 110, or portions thereof, may be stored in a remote memory storage device. By way of example, and not limitation, FIG. 1 illustrates remote application programs 185 as residing on remote computer 180. It will be appreciated that the network connections shown are exemplary and other means of establishing a communications link between the computers may be used.

Figure 2:
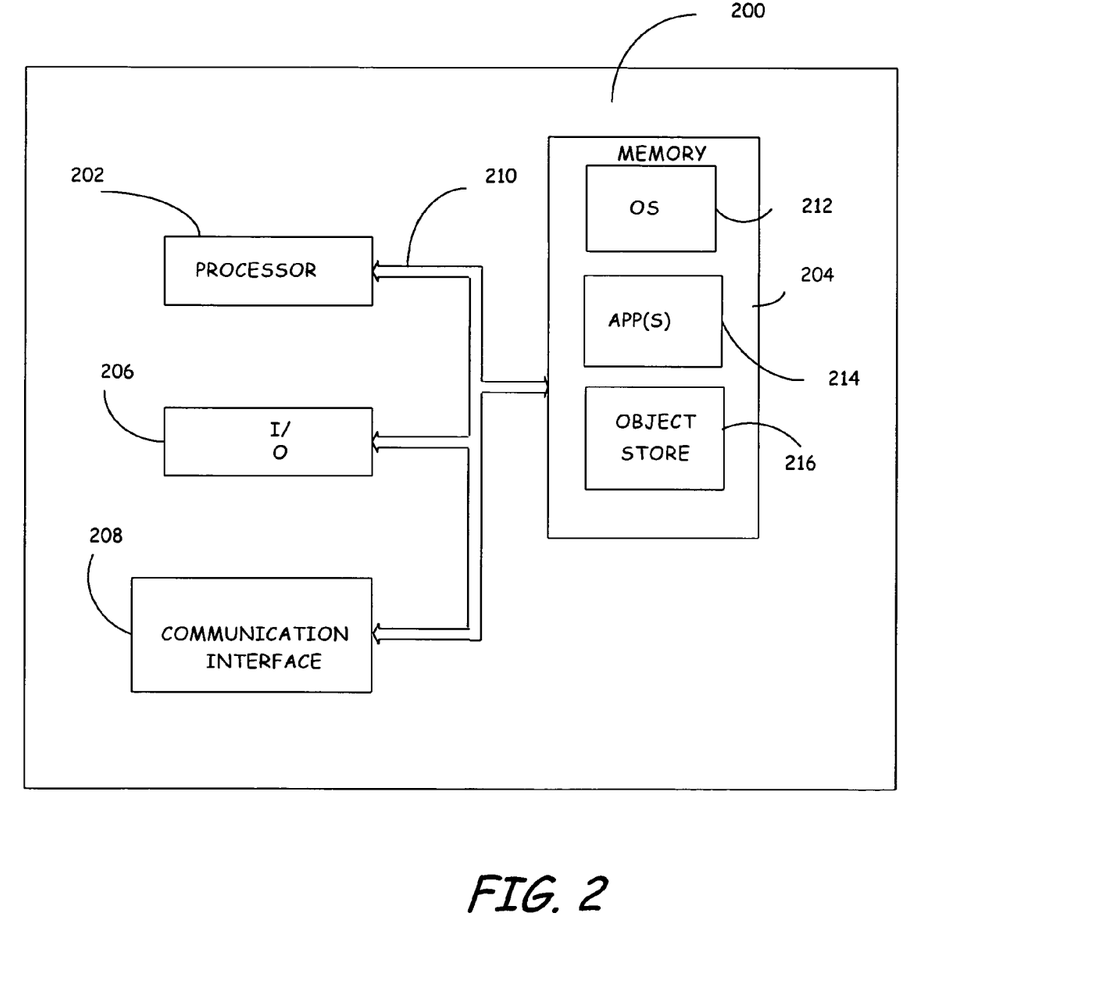
FIG. 2 is a block diagram of an alternative computing environment in which the present invention can be practiced.

FIG. 2 is a block diagram of mobile device 200, which is another exemplary computing environment for practicing aspects of the present invention. Mobile device 200 includes microprocessor 202, memory 204, input/output (I/O) components 206, and communication interface 208 for communicating with remote computers or other mobile devices. In one embodiment, the afore-mentioned components are coupled for communication with one another over suitable bus 210.

Memory 204 is implemented as non-volatile electronic memory such as random access memory (RAM) with a battery back-up module (not shown) such that information stored in memory 204 is not lost when the general power to mobile device 200 is shut down. A portion of memory 204 is preferably allocated as addressable memory for program execution, while another portion of memory 204 is preferably used for storage, such as to simulate storage on a disk drive.

Memory 204 includes operating system 212, application programs 214 as well as object store 216. During operation, operating system 212 is preferably executed by processor 202 from memory 204. Operating system 212, in one preferred embodiment, is a WINDOWS® CE brand operating system commercially available from Microsoft Corporation. Operating system 212 is preferably designed for mobile devices, and implements database features that can be utilized by applications 214 through a set of exposed application programming interfaces and methods. The objects in object store 216 are maintained by applications 214 and operating system 212, at least partially in response to calls to the exposed application programming interfaces and methods.

Communications interface 208 represents numerous devices and technologies that allow mobile device 200 to send and receive information. The devices include wired and wireless modems, satellite receivers and broadcast tuners to name a few. Mobile device 200 can also be directly connected to a computer to exchange data therewith. In such cases, communication interface 208 can be an infrared transceiver or a serial or parallel communication connection, all of which are capable of transmitting streaming information.

Input/output components 206 include a variety of input devices such as a touch-sensitive screen, buttons, rollers, and a microphone as well as a variety of output devices including an audio generator, a vibrating device, and a display. The devices listed above are by way of example and need not all be present on mobile device 200. In addition, other input/output devices may be attached to or found with mobile device 200 within the scope of the present invention.

Figure 3:
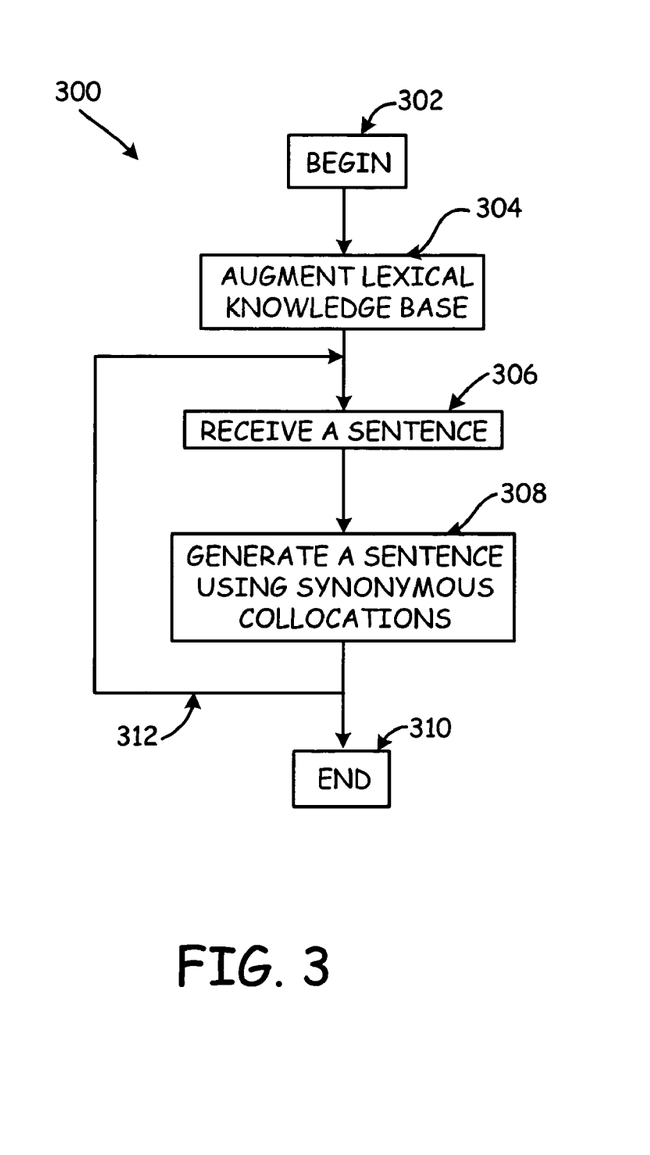
FIG. 3 is an overview flow diagram illustrating two aspects of the present invention.
Figure 4:
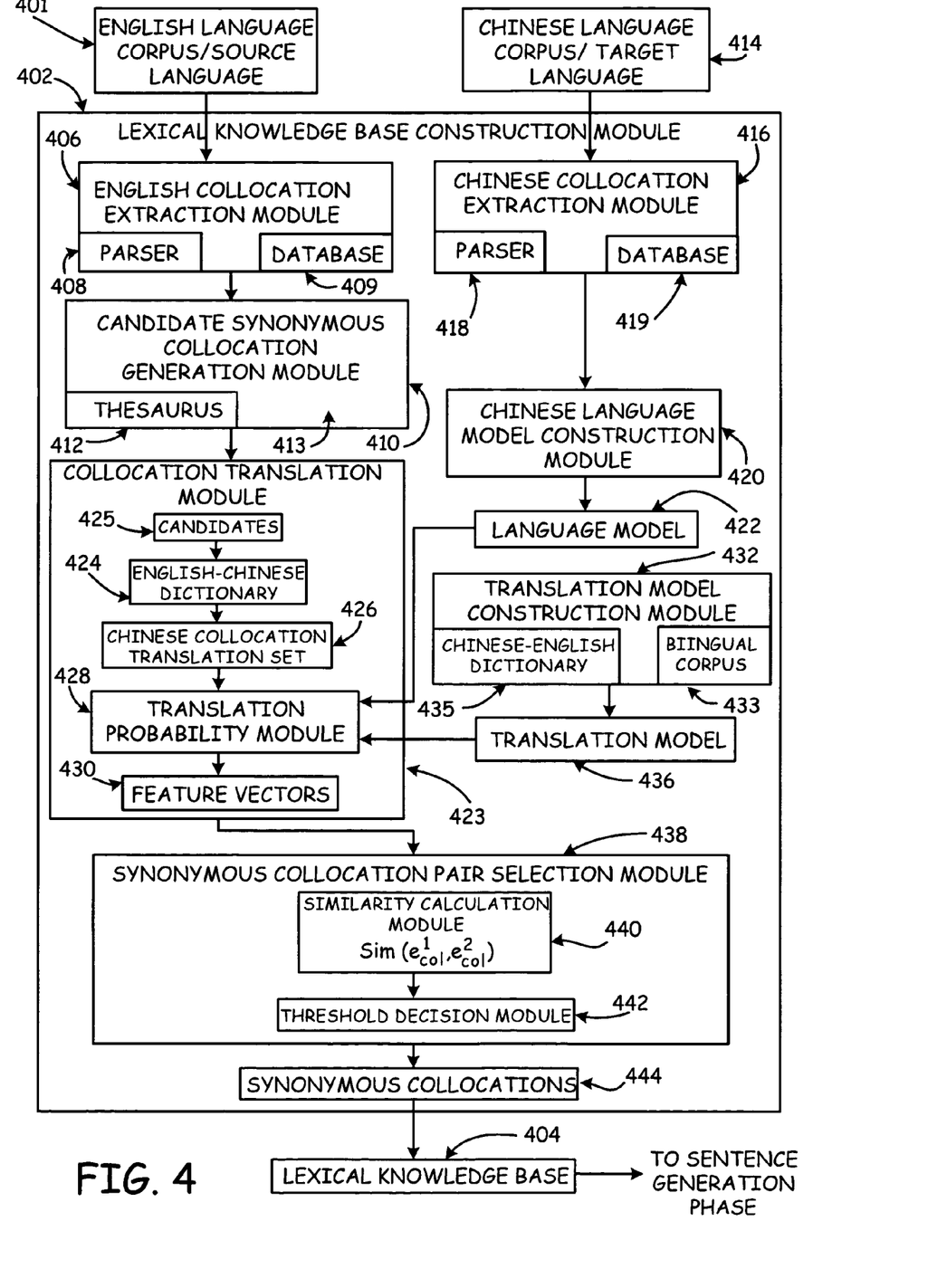
FIG. 4 is a block diagram of a system for augmenting a lexical knowledge base.
Figure 5:
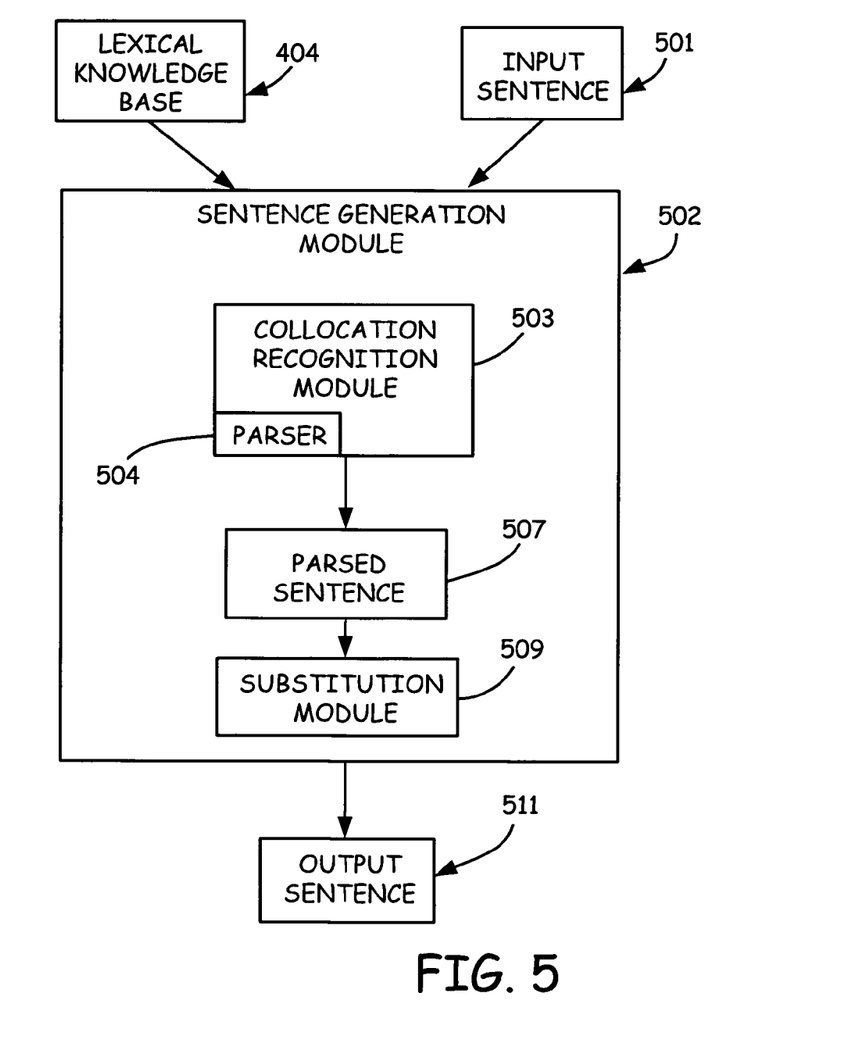
FIG. 5 is a block diagram of a system for performing language generation.

FIG. 3 is an overview flow diagram showing two general aspects of the present invention embodied as a single method 300. FIGS. 4 and 5 are block diagrams illustrating modules for performing each of the aspects. It should be understood that the block diagrams and flowcharts described herein are illustrative for purposes of understanding and should not be considered limiting. For instance, modules or steps can be combined, separated, or omitted in furtherance of practicing aspects of the present invention.

Referring to FIGS. 3 and 4, lexical knowledge base construction module 402 performs step 304 in method 300 to augment lexical knowledge base 404 (shown in FIG. 4). Lexical knowledge base construction module 402 augments or provides lexical knowledge base 404 with synonymous collocation information used later to perform step 308 (shown in FIG. 3) to generate a sentence or text using synonymous collocations. Step 304 is discussed in greater detail below in conjunction with FIG. 6. Briefly, in step 304, lexical knowledge base construction module 402 can augment lexical knowledge base 404 with information such as collocation databases, a language model of collocations, and a translation model of collocations.

Lexical knowledge base construction module 402 receives source language data illustrated as English language corpus 401 necessary to augment lexical knowledge base 404. In one embodiment, the source language data comprises "unprocessed" data, such as data that can be obtained from newspapers, books, publications and journals, web sources and the like. The unprocessed source language data can be received from any of the input devices described above as well as from any of the data storage devices described above. It is important to note that use of English as source language is illustrative only. Lexical knowledge base construction module 402 can be an application program 135 executed on computer 110 or stored and executed on any of the remote computers in the LAN 171 or the WAN 173 connections. Likewise, lexical knowledge base 404 can reside on computer 110 in any of the local storage devices, such as hard disk drive 141, or on an optical CD, or remotely in the LAN 171 or the WAN 173 memory devices.

Collocation Extraction

Source or English language corpus 401 is provides as an input to source or English collocation extraction module 406 having parser 408. As noted above, a collocation comprises a word pair that has some syntactical relation, such as <verb, OBJ, noun>, also known as a dependency triple or "triple." Sentences in English language corpus 401 are parsed into component dependency triples using suitable parser 408.

Parser output can be a phrase structure parse tree or a logical form represented with dependency triples. For example, the sentence "She owned this red coat." can be parsed into the following four triples: <own, SUBJ, she>, <own, OBJ, coat>, <coat, DET, this>, and <coat, ATTR, red>. Generally, these triples are represented in the form of <head $w_1$, relation-type r, modifier $w_2$> as is well known.

One measure or value used to extract or define collocations, from the parsed triples is called weighted mutual information (WMI) discussed in "A Technical Word- and Term-Translation Aid Using Noisy Parallel Corpora Across Language Groups" by P. Fung and K. McKeown in Machine Translation, Vol. 1-2(special issue), pp. 53-87 and which can be expressed as the following equation:

$$\text{WMI}(w_1, r, w_2) = p(w_1, r, w_2) \log \frac{p(w_1, r, w_2)}{p(w_1 \mid r) p(w_2 \mid r) p(r)} \quad \text{Eq. 1.}$$

where $p(w_1,r,w_2)$ is the probability of $(w_1,r,w_2)$; $p(w_1|r)$ is the probability of $w_1$ given r; $p(w_2|r)$ is the probability of $w_2$ given r; and $p(r)$ is the probability of r. These probabilities can be estimated from English language corpus 401 and from Chinese language corpus 414 in Chinese collocation extraction mode 416 described below. Those triples whose WMI values are larger than a given or selected threshold are taken or extracted as collocations. Although weighted mutual information has been illustrated for extracting collocations, any known method of extracting collocations from unprocessed language data or corpus can be used.

Similarly, lexical knowledge base construction module 402 receives unprocessed target language or Chinese language corpus 414 necessary to augment lexical knowledge base 404. Target language data can be provided from any of the input devices described above as well as from any of the data storage devices described above. It is also noted that use of Chinese is illustrative only and that other target languages can be used. In addition, aspects of the present invention are not limited to only one target language. For example, it can be advantageous to use one target language for some types of collocation relation-types and another target language for other relation-types.

Lexical knowledge base construction module 402 further comprises a target language or Chinese collocation extraction module 416 having parser 418. Parser 418 parses or segments Chinese language corpus 414 into dependency triples ("triples") such as <verb, OBJ, noun>. Chinese collocation extraction module 416 extracts parsed Chinese triples such as by selecting those triples that have WMI values larger than a given or selected threshold as described above.

The total number and unique source language collocations (e.g. English) extracted by module 406 are stored in an appropriate database 409. Similarly, target or Chinese collocations extracted by module 416 are stored in a database 419.

In actual experiments, English collocations for three kinds of collocations were extracted from the Wall Street Journal (1987-1992). The extracted English collocations are shown the table below:

| Class | Type | Tokens |
|---|---|---|
| Verb, OBJ, noun | 506,628 | 7,005,455 |
| Noun, ATTR, adj. | 333,234 | 4,747,970 |
| Verb, MOD, adv. | 40,748 | 483,911 |

Similarly, Chinese collocations were extracted from the People's Daily (1980-1998) which are summarized in the table below:

| Class | Type | Tokens |
|---|---|---|
| Verb, OBJ, noun | 1,579,783 | 19,168,229 |
| Noun, ATTR, adj. | 311,560 | 5,383,200 |
| Verb, MOD, adv. | 546,054 | 9,467,103 |

The threshold was set at 5 for both English and Chinese. "Tokens" refers to the total number of collocations extracted and "Type" refers to the number of unique collocations among the total extracted. Extracted Chinese collocations are used to train a language model constructed in Chinese language model construction module 420 as described below.

Candidate Synonymous Collocations

English collocations extracted at English collocation extraction module 406 are input or received by candidate synonymous collocation generation module 410, which generates candidate synonymous collocations or "candidates" from the extracted English collocations. Candidates are generated based on the following assumption: For a given collocation in the form: <head, relation-type, modifier>, a synonymous collocation or expression usually takes the same form, i.e. <head, relation-type, modifier>. Sometimes, however, synonymous expressions can comprise a single word or sentence pattern.

Candidate synonymous collocation generation module 410 expands a given English collocation by generating one or more synonyms for each of the "head" and/or "modifier" using any known means of generating word synonyms, such as an English language thesaurus. In one embodiment, candidate synonymous collocation generation module 410 accesses thesaurus 412 such as WordNet 1.6, which was developed at Princeton University of Princeton, N.J. and is available publicly, to generate head and modifier synonyms. In WordNet, for example, one synonym set or "synset" comprises several synonyms representing a single sense or denotation. Polysemous words such as "turn on" can occur in more than one synset each having a different sense. Synonyms of a given word are generated or obtained from all the synsets including the given word. For illustration, the word "turn on" is a polysemous word and is included in several synsets. For the sense "cause to operate by flipping a switch", "switch on" is one of its synonyms. For the sense "be contingent on", "depend on" is one of its synonyms. Both "depend on" and "switch on" are generated as synonyms of "turn on". However, the generated candidate set contains some errors because, for example, "depend on" is generated as a synonym of "turn on" and "illumination" is generated as a synonym of "light". However, the triple <depend on, OBJ, illumination> is not a synonymous collocation of the triple <switch on, OBJ, light>.

Formally, suppose $C_w$ indicates the synonym set of a word w and U denotes the English collocation set extracted in English collocation extraction module 406. The following table represents a method or algorithm that can be used to generate candidate synonymous collocations in module 410.

(1) For each collocation $Col_i$ =<head $w_1$, relation-type R, modifier $w_2$> ∈ U, do the following steps.
    a. Expand the Head and Modifier using thesaurus 412 to obtain synonym sets $C_{Head}$ and $C_{Modifier}$.
    b. Generate a candidate set of its synonymous collocations:
        $S_i = \{Col_j\} = \{<w_1, R, w_2>\} | w_1 \in \{Head\} \cup C_{Head}$ & $w_2 \in \{Modifier\} \cup C_{Modifier}$ & $<w_1, R, w_2> \in U$ & $<w_1, R, w_2> \neq Col_i$ (2) Generate the candidate set of synonymous collocation pairs:
        $SC = \{(Col_i, Col_j) | Col_i\}$

Language Model and Construction

Referring back to Chinese collocation extraction module 416, extracted Chinese or target language collocations stored in Chinese collocation database 419 are input or received by Chinese language model construction module 420. Chinese language model construction module 420 constructs a language model of probability information for Chinese collocations in Chinese collocation database 419. In some embodiments, an interpolation method can smooth the language model to mitigate data sparseness problems.

Generally, the probability of a given Chinese collocation occurring in Chinese language corpus 414 is approximated by the following:

$$p(c_{col}) = \frac{count(c_{col})}{N} \quad \text{Eq. 2.}$$

where count($c_{col}$) represents the count of the Chinese collocation ($c_{col}$) and N is the total counts of all the Chinese collocations in the training corpus stored in database 419. For a collocation $<c_1, r_c, c_2>$, it is assumed that two target, herein Chinese, words $c_1$ and $c_2$ are conditionally independent given $r_c$. Therefore, the above equation can be rewritten as follows:

$$p(c_{col}) = p(c_1|r_c)p(c_2|r_c)p(r_c) \quad \text{Eq. 3.}$$

where $$p(c_1 | r_c) = \frac{count(c_1, r_c, *)}{count(*, r_c, *)}, \quad \text{Eq. 4.}$$

$$p(c_2 | r_c) = \frac{count(*, r_c, c_2)}{count(*, r_c, *)}, \quad \text{and} \quad \text{Eq. 5.}$$

$$p(r_c) = \frac{count(*, r_c, *)}{N}. \quad \text{Eq. 6.}$$

Further, count($c_1, r_c, *$) is the frequency or count of collocations with $c_1$ as the head and $r_c$ as the relation type; count($*, r_c, c_2$) is the frequency or count of collocations with $r_c$ as the relation type and $c_2$ as the modifier; and count($*, r_c, *$) is the frequency or count of collocations having $r_c$ as the relation type. The symbol * denotes any word that forms part of a particular collocation. In other embodiments, the language model can be smoothed by interpolating in order to mitigate data sparseness as follows:

$$p(c_{col}) = \lambda \frac{count(c_{col})}{N} + (1-\lambda)p(c_1 | r_c)p(c_2 | r_c)p(r_c) \quad \text{Eq. 7.}$$

where λ is a constant or smoothing factor such that 0<λ<1.

Thus, Chinese language model construction module 420 generates, estimates or calculates probabilities $p(c_{col})$ for each Chinese collocation using the above equations and the set Chinese collocations such as in database 419 to build target language model 422. Language model 422 is used later to generate translation probabilities in module 428 described in further detail below.

Collocation Translation from Source to Target Language

Referring back to module 410, collocation translation module 423 receives candidate synonymous collocations or candidates 425 from module 410. Candidates 425 are to be translated from English to one or more languages such as Chinese to form Chinese collocation translation set 426. Candidate synonymous collocations each in the form of <head, relation-type, modifier> are translated by translating each corresponding "head" and "modifier" using a bilingual English-Chinese lexicon or dictionary 424 accessed by collocation translation module 423.

In other words, candidates or English language collocations in the form $e_{col}=<e_1, r_e, e_2>$ are translated into target or Chinese language collocations in the form $c_{col}=<c_1, r_c, c_1>$ using English-Chinese dictionary 424. If the Chinese translation sets of $e_1$ and $e_2$ are represented as $CS_1$ and $CS_2$, respectively, the Chinese collocation translation set 426 can be represented as:

$$S = \{<c_1, r_c, c_2> | c_1 \in CS_1, c_2 \in CS_2, r_e \in R\} \quad \text{Eq. 8.}$$

where R denotes a relation set of similar relation-types. Typically, $e_1$ and $e_2$ each have multiple translations listed in English-Chinese dictionary 424.

Translation Probabilities and Translation Model

Next, it is necessary to calculate translation probability information $p(c_{col}|e_{col})$ indicated at translation probability module 428. In some embodiments, bilingual corpus 433 is used to calculate translation probabilities described in greater detail below. Given an English collocation $e_{col}=<e_1, r_e, e_2>$ and a Chinese collocation $c_{col}=<c_1, r_c, c_2>$, the probability that $e_{col}$ is translated into $c_{col}$ is calculated using Baye's Theorem as follows:

$$p(c_{col} | e_{col}) = \frac{p(e_{col} | c_{col})p(c_{col})}{p(e_{col})} \quad \text{Eq. 9.}$$

where $p(e_{col}|c_{col})$ is often called the translation model 436 described below and $p(c_{col})$ is the language model 422. Therefore, a translation model and a language model are needed to calculate translation probabilities or values of $p(c_{col}|e_{col})$. Language model $p(c_{col})$ was described above in the section entitled Target Language Model and Construction. Values for the denominator $p(e_{col})$ can be obtained directly from a database 409 of English collocations obtained from English collocation extraction module 406, or otherwise received by translation probability module 428 from any of the input or storage devises described above. For further understanding, since $p(e_{col})$ is independent of $c_{col}$ and is a constant for a given English collocation, the most probable Chinese collocation translation $c_{max}$ is given by:

$$c_{max} = \text{argmax } p(e_{col}|c_{col})p(c_{col}) \quad \text{Eq. 10.}$$

However, if the equation for $p(e_{col}|c_{col})$ were used directly, there can be accuracy problems due to data sparseness. Therefore, the equation for $p(e_{col}|c_{col})$ can be simplified using the following assumptions.

Assumption 1: For a Chinese collocation $c_{col}$ and $r_e$, it is assumed that $e_1$ and $e_2$ are conditionally independent. Therefore, the translation model can be rewritten or approximated as follows:

$$p(e_{col}|c_{col}) = p(e_1, r_e, e_2|c_{col}) = p(e_1|r_e, c_{col}) p(e_2|r_e, c_{col}) p(r_e|c_{col}) \quad \text{Eq. 11.}$$

Assumption 2: Given a Chinese collocation $<c_1, r_c, c_2>$, it is assumed that the translation probability $p(e_i|c_{col})$ only depends on $e_i$ and $c_i$ (i=1,2), and $p(r_e|c_{col})$ only depends or $r_e$ and $r_c$. Equation 11 can them be rewritten or approximated as:

$$p(e_{col}|c_{col}) = p(e_1|c_{col}) p(e_2|c_{col}) p(r_e|c_{col}) = p(e_1|c_1) p(e_2|c_2) p(r_e|r_c) \quad \text{Eq. 12.}$$

Equation 12 is equivalent to the word translation model if the relation-type is considered as another element such as a word.

Assumption 3: Assume that one type of English collocation can only be translated into the same type of Chinese collocation then $p(r_e|r_c)=1$ and Equation 12 simplifies to:

$$p(e_{col}|c_{col}) = p(e_1|c_1) p(e_2|c_2) \quad \text{Eq. 13.}$$

In other words, the collocation translation probability is approximated as the product of the individual translation probabilities of component words. The probabilities $p(e_1|c_1)$ and $p(e_2|c_2)$ can be calculated using a word translation model constructed with unparallel or parallel bilingual corpus.

In some embodiments, translation model construction module 432 constructs translation model 436 using bilingual corpus 433 and target-source language or Chinese-English lexicon or dictionary 435 to align the bilingual corpus, such as described in "Finding Target Language Correspondence for Lexicalized EBMT System," by Wang et al., In Proc. Of the Sixth Natural Language Processing Pacific Rim Symposium. However, in the present invention other known methods of calculating or estimating word translation probabilities can be used, such as described in "Estimating Word Translation Probabilities from Unrelated Monolingual Corpora using the EM Algorithm," by P. Koehn and K. Knight, National Conference on Artificial Intelligence (AAAI 2000) and "The mathematics of statistical machine translation: parameter estimation" by Brown et al., Computational Linguistics, 19(2), pp. 263-311 which are herein incorporated by reference in their entirety.

Further, the language model and the translation model can be combined to obtain the collocation translation model in equation 9 as follows:

$$p(c_{col}|e_{col}) = \frac{p(e_1|c_1) p(e_2|c_2)}{p(e_{col})} * \left( \lambda \frac{\text{count}(c_{col})}{N} + (1-\lambda) p(c_1|r_c) p(c_2|r_c) p(r_c) \right) \quad \text{Eq. 13.1}$$

where $\lambda$ is a smoothing factor as defined in equation 7.

In some embodiments, in order to mitigate the problem with data sparseness, simple smoothing is conducted by adding 0.5 to the counts of each word translation pair as follows:

$$p(e|c) = \frac{\text{count}(e, c) + 0.5}{N} \quad \text{Eq. 14.}$$

Feature Vectors and Similarity Calculation

Chinese collocation translation sets 426 and corresponding values for $p(c_{col}|e_{col})$ generated in module 428 can be used to construct feature vectors 430 for each English collocation among pairs of candidate synonymous collocations generated in module 410. Feature vectors can be represented as follows:

$$Fe_{col}^i = <(c_{col}^{i1}, p_{col}^{i1}), (c_{col}^{i2}, p_{col}^{i2}), \ldots, (c_{col}^{im}, p_{col}^{im})> \quad \text{Eq. 15.}$$

where i=1, 2 for each pair of candidate synonymous collocations and m is the number of collocations in Chinese collocation translation set 426 for a given English collocation. In some embodiments, however, m can be a selected number to limit the number of features in each feature vector while ensuring adequate accuracy.

Feature vectors associated with individual English collocations are received by synonymous collocation pair selection module 438. Synonymous collocation pair selection module 438 comprises similarity calculation module 440 that calculates similarity between collocations $e_{col}^1, e_{col}^2$ using their feature vectors. The assumption behind this method is that two collocations are similar if their context is similar. In one embodiment, module 440 calculates $sim(e_{col}^1, e_{col}^2)$ using a method called the cosine method. The similarity of $e_{col}^1, e_{col}^2$ using the cosine method is given as follows:

$$sim(e_{col}^1, e_{col}^2) = \cos(Fe_{col}^1, Fe_{col}^2) \quad \text{Eq. 16}$$

$$= \frac{\sum_{c_{col}^{1i} = c_{col}^{2j}} p_{col}^{1i} * p_{col}^{2j}}{\sqrt{\sum_i (p_{col}^{1i})^2} * \sqrt{\sum_j (p_{col}^{2j})^2}}$$

There are other measures or ways of calculating similarity between two vectors that can be used, such as ways of calculating relative distance between two vectors. However, the cosine method is useful because it can achieve good results, especially in calculating similarity between two sentences in information retrieval. Also, the cosine method generally works well in evaluating actual results.

Similarity values calculated in module 440 are compared to a threshold value at threshold decision module 442. Collocation pairs that exceed a threshold value are selected at module 442 as synonymous collocations. It is noted, however, that the threshold value for different types of collocations can be different. For example, synonymous collocations in the form <verb, OBJ, noun> potentially can have a different threshold value than synonymous collocations in the form <noun, ATTR, adjective>. Synonymous collocation pair selection module generates synonymous collocations 444 which can be stored as a database to augment lexical knowledge base 404 used later in the sentence generation phase as indicated on FIG. 4.

Referring to FIGS. 3 and 5, sentence generation module 502 performs step 308 in method 300 to generate a sentence or text using synonymous collocations received from lexical knowledge base 404 illustrated on FIGS. 4 and 5. Sentence generation module 502 can be an application program 135 executed on computer 110 or stored and executed on any of the remote computers in the LAN 171 or the WAN 173 connections.

Sentence generation module 502 receives input sentence, or portion thereof, indicated and herein referred to as "input sentence 501" from any of the input devices or storage devices described above. Input sentence 501 can be a sentence or text that can be selectively modified using synonymous collocations. For instance, a user could input a source or English language sentence 501. In one embodiment, sentence generation module 502 can automatically modify input sentence 501 using synonymous collocations. In other embodiments, sentence generation module 502 can provide as an output one or more synonymous collocations that can be selected to modify input sentence 501 for various natural language processing applications as described above.

Sentence generation module 502 comprises collocation recognition module 503 which receives input sentence 501. Collocation recognition module 503 comprises triple parser 503 which can be the same or similar to parser 408 illustrated on FIG. 4. Triple parser 503 parses received input sentence 501 into dependency triples. Collocation recognition module 503 recognizes or selects which of the parsed triples are collocations in the same or similar manner as English collocation extraction module 406.

Parsed sentence 507 generated by collocation recognition module 503 is received by substitution module 509. Substitution module 509 substitutes synonymous collocations in place of collocations recognized at module 503. In some embodiments, the substitutions can be automatic. In other embodiments, the substitutions are selectable.

In still other embodiments, sentence generation module 502 can be a sentence translation module. In these embodiments, input sentence 501 is a sentence, which will be translated into another language using the English language collocations in lexical knowledge base 404. In these embodiments, sentence generation module 502 receives input sentence 501 in a language such as Chinese. Collocation recognition module 503 recognizes Chinese collocations in input sentence 501 using parser 504. Parser 504 can be the same or similar as parser 418 illustrated in FIG. 4. Collocation recognition module 503 generates parsed sentence 507 which is received by substitution module 509. Substitution module 509 substitutes English language collocations in lexical knowledge base 404 to generate output sentence 511.

A grammar module can be included in sentence generation module 502 to ensure that output sentence 511 is grammatically correct after receiving each of the substituted synonymous collocations from substitution module 509.

Figure 6:
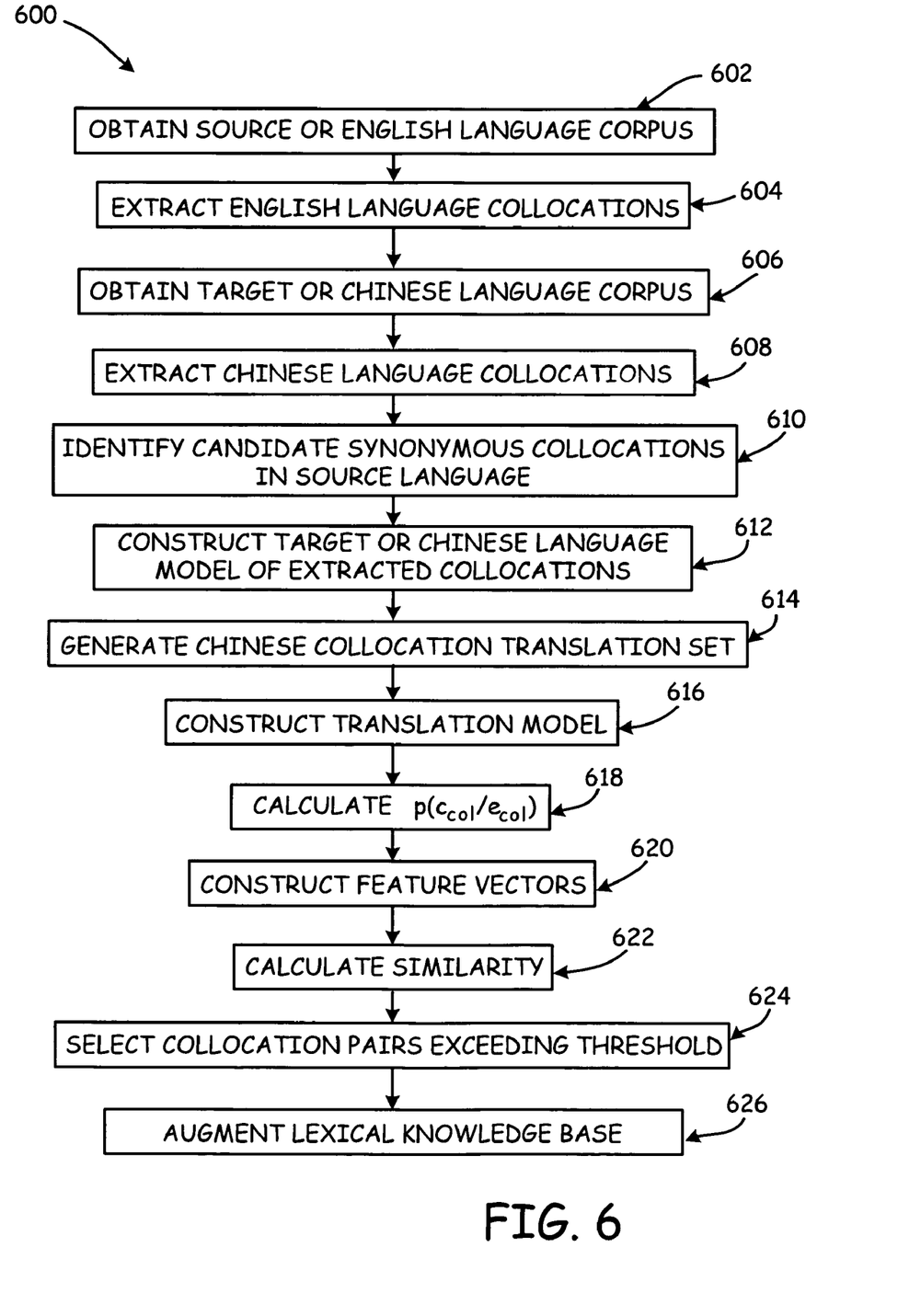
FIG. 6 a flow diagram illustrating augmentation of the lexical knowledge base.

FIG. 6 is a flowchart 600 illustrating exemplary steps for augmenting lexical knowledge base 404 during the initialization phase to include information used to perform language generation. It is noted that the step order illustrated in FIG. 6 is exemplary only and can be adjusted as desired. Generally, step 602 and step 604 together process unprocessed source or English language corpus to extract or generate English language collocations. At step 602, English language corpus is obtained or received from any of the input or storage devices described above. At step 604, the English language corpus is parsed into dependency triples. Dependency triples meeting certain criteria such as weighted mutual information described above are recognized as collocations and extracted. The extracted English language collocations can be stored in a database for later processing.

Step 606 and step 608 together process unprocessed target or Chinese language corpus to extract or generate Chinese collocations. At step 606, unprocessed Chinese language corpus is obtained or received from any of the input or storage devices described above. At step 608, Chinese language corpus is parsed into dependency triples. Dependency triples that are recognized as collocations are extracted or generated as described above. The Chinese language collocations extracted at step 608 can be stored in databases for further processing.

At step 610, candidate synonymous collocations are identified or generated using, for example, a source language thesaurus as is described in greater detail above. Generally, an extracted English language collocation in the form <head, relation-type, modifier> is expanded with synonyms of the head and the modifier to generate candidate synonymous collocations. A thesaurus can be used to provide synonyms for the expansions.

At step 612, a language model of the extracted target or Chinese language collocations is constructed. The language model provides probability information of the extracted Chinese language collocations and is used later in estimating translation probabilities for Chinese collocations in translation sets generated at step 614 below.

At step 614, each candidate synonymous collocations generated at step 610 is translated into a Chinese collocation translation set. A source-target language dictionary, such as an English-Chinese dictionary is used to translate each of the head and the modifier to generate the Chinese language translation sets.

At step 616, a word translation model is constructed to provide translation information of component words used later in estimating translation probabilities for Chinese collocations in translation sets generated at step 614.

At step 618, translation probabilities, $p(c_{col}|e_{col})$ for Chinese collocations in the Chinese collocation translation sets are calculated using the language model constructed at step 612 and the translation model constructed at step 616.

At step 620, feature vectors $Fe_{col}^1, Fe_{col}^2$ are constructed for candidate synonymous collocations identified in step 610. The feature vectors are in the form $$Fe_{col}^i = <(c_{col}^{i1}, p_{col}^{i1}), (c_{col}^{i2}, p_{col}^{i2}), \ldots, (c_{col}^{im}, p_{col}^{im})> \qquad \text{Eq. 17}$$

where i equals 1 or 2 for a candidate English collocation pair and m is the number of Chinese collocations in a Chinese collocation translation set corresponding with a particular candidate English collocation. Generally, the Chinese collocations can be ranked from most to least probable.

At step 622, similarity information for candidate English language collocations is calculated or generated using the feature vectors. In some embodiments, the cosine method is used to calculate similarities. However, other known methods of calculating similarity can be used as described above.

At step 624, English language collocations having a similarity value exceeding a selected threshold are selected as synonymous collocations. In some embodiments, the selected threshold can differ for collocations having different relation-types.

At step 626, a lexical knowledge base is augmented with the generated or selected synonymous collocations that can be used later in desired applications such as language generation.

Figure 7:
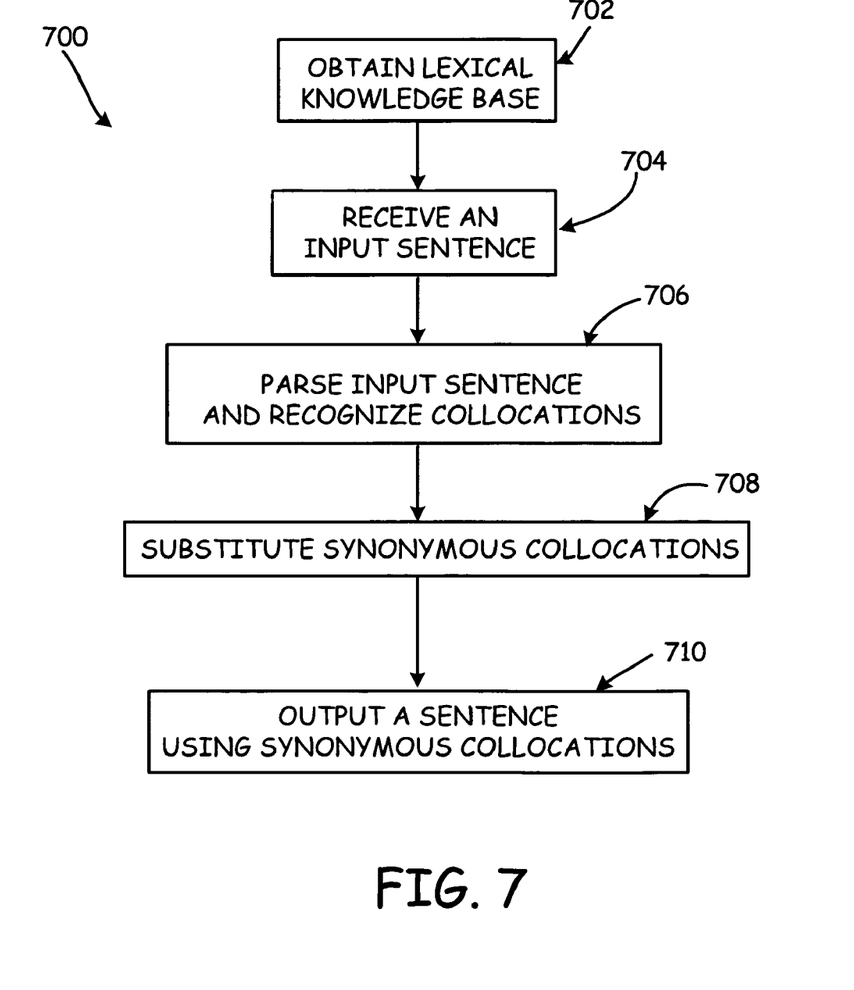
FIG. 7 is a flow diagram illustrating language generation.

FIG. 7 illustrates method 700 of generating language using the lexical knowledge base constructed by another aspect of the present invention. At step 702, a lexical knowledge base having stored synonymous collocations is accessed, obtained or received from any of the input devices described above or from any of the data storage devices described above. An input sentence is received at step 704. At step 706, the input sentence is parsed in order to recognize collocations as described above.

At step 708, synonymous collocations are substituted for collocations in the input sentence. The substituting can occur automatically or be selectable. At step 710, an output sentence is generated having synonymous collocations.

Although the present invention has been described with reference to particular embodiments, workers skilled in the art will recognize that changes may be made in form and detail without departing from the spirit and scope of the invention.

Although the present invention has been described with reference to particular embodiments, workers skilled in the art will recognize that changes may be made in form and detail without departing from the spirit and scope of the invention.

What is claimed is:

1. A computer readable storage medium including instructions readable by a computer which, when implemented, cause the computer to generate synonymous collocations comprising:
    extracting collocations from a monolingual corpus;
    generating candidate synonymous collocations from the extracted collocations;
    selecting synonymous collocations from the candidate synonymous collocations as a function of translation information; and
    providing an output based at least in part on the synonymous collocations.

2. The computer readable storage medium of claim 1 wherein extracting includes parsing the monolingual corpus into dependency triples.

3. The computer readable storage medium of claim 2 wherein extracting includes calculating weighted mutual information values for the parsed dependency triples.

4. The computer readable storage medium of claim 1 wherein generating candidate synonymous collocations includes expanding component words of extracted collocations with synonyms of the component words.

5. The computer readable storage medium of claim 4 wherein expanding component words includes using a thesaurus.

6. The computer readable storage medium of claim 1 and further comprising translating candidate synonymous collocations to construct a translation set comprising collocation translations for each candidate synonymous collocation.

7. The computer readable storage medium of claim 6 and further comprising building a language model of probabilities of collocations obtained from a target language corpus.

8. The computer readable storage medium of claim 6 wherein translating includes using a bilingual lexicon to translate component words of each candidate synonymous collocation to construct the translation set.

9. The computer readable storage medium of claim 6 wherein selecting comprises selecting synonymous collocations as a function of the collocation translations.

10. The computer readable storage medium of claim 9 wherein selecting comprises calculating probabilities of the collocation translations.

11. The computer readable storage medium of claim 6 wherein selecting comprises constructing a translation model of probabilities of candidate synonymous collocations as a function of the collocation translations.

12. The computer readable storage medium of claim 11 wherein constructing the translation model includes approximating the probabilities as the product of individual translation probabilities of component words of the candidate synonymous collocations and associated collocation translations.

13. The computer readable storage medium of claim 11 wherein constructing a translation model includes using a bilingual corpus to approximate word translation probabilities of component words of the candidate synonymous collocations.

14. The computer readable storage medium of claim 6 wherein selecting synonymous collocations comprises generating feature vectors of the candidate synonymous collocations as a function of the translation sets and the translation information.

15. The computer readable storage medium of claim 14 wherein selecting synonymous collocations comprises calculating a measure of similarity as a function of the feature vectors.

16. The computer readable storage medium of claim 15 wherein calculating similarity information comprises using the cosine method.

17. The computer readable storage medium of claim 15 wherein selecting synonymous collocations comprises selecting synonymous collocations exceeding a similarity threshold.

18. The computer readable storage medium of claim 1 and further comprising:
    parsing input text into at least one collocation;
    substituting said at least one collocation in the input text with one of the selected synonymous collocations; and
    generating output text using said one of the selected synonymous collocations.

19. A computer readable storage medium including instruction readable by a computer which, when implemented, cause the computer to generate a sentence comprising:
    parsing input text into at least one collocation;
    obtaining synonymous collocations selected as a function of translation information;
    selecting at least one synonymous collocation for said at least one collocation; and
    generating an output comprising a sentence based at least in part on the at least one synonymous collocation.

20. The computer readable storage medium of claim 19 wherein obtaining comprises obtaining synonymous collocations from a lexical knowledge base.

21. The computer readable storage medium of claim 19 wherein selecting comprises selectively substituting synonymous collocations.

22. The computer readable storage medium of claim 19 wherein selecting comprises automatically substituting synonymous collocations.

23. A method of constructing synonymous collocation information comprising:
    extracting collocations from unprocessed language corpus;
    generating with a processor candidate synonymous collocations from the extracted collocations;
    selecting synonymous collocations from the candidate synonymous collocations based on translation information; and
    providing an output based at least in part on the synonymous collocations.

24. The method of claim 23 wherein the extracted collocations are extracted from unprocessed source language corpus and further comprising:

parsing the unprocessed source language corpus into dependency triples; and recognizing collocations in the parsed source language dependency triples;

parsing unprocessed target language corpus into dependency triples; and recognizing collocations in the parsed source language dependency triples.

25. The method of claim 23 wherein generating candidate synonymous collocations comprises obtaining synonyms of component words in the extracted collocations.

26. The method of claim 23 and further comprising translating the candidate synonymous collocations into a translation set comprising collocation translations.

27. The method of claim 26 and further comprising calculating translation probabilities of the collocation translations.

28. The method of claim 27 and further comprising generating feature vectors for pairs of candidate synonymous collocations as a function of the collocation translations and associated translation probabilities.

29. The method of claim 28 and further comprising generating similarity values for pairs of feature vectors.

30. The method of claim 29 wherein selecting synonymous collocations comprises selecting pairs of candidate synonymous collocations having similarity values exceeding a selected threshold.

31. A method of generating language comprising:

parsing an input sentence into collocations;

accessing with a processor a database of synonymous collocations generated using translation information;

substituting parsed collocations in the input sentence with synonymous collocations from the database; and providing an output based at least in part on the synonymous collocations substituted for the parsed collocations in the input sentence.

32. The method of claim 31 wherein parsing includes parsing the input sentence in one language and wherein accessing includes accessing a database of synonymous collocations in a language different from the input language.

33. The method of claim 31 wherein accessing includes accessing synonymous collocations selected as a function of translation information comprising collocation translations and corresponding translation probabilities.

34. The method of claim 33 wherein accessing includes accessing synonymous collocations selected based on similarity values calculated using the collocation translations and corresponding translation probabilities.

* * * * *

UNITED STATES PATENT AND TRADEMARK OFFICE
CERTIFICATE OF CORRECTION

PATENT NO. : 7,689,412 B2
APPLICATION NO. : 10/729126
DATED : March 30, 2010
INVENTOR(S) : Hua Wu et al.

It is certified that error appears in the above-identified patent and that said Letters Patent is hereby corrected as shown below:

In column 4, line 17, delete "RE" and insert -- RF --, therefor.

Signed and Sealed this
Seventeenth Day of May, 2011

David J. Kappos
*Director of the United States Patent and Trademark Office*